(12) United States Patent
Naumann et al.

(10) Patent No.: US 10,305,269 B2
(45) Date of Patent: May 28, 2019

(54) CABLE/LINE LEAD-IN (71) Applicant: EATON PROTECTION SYSTEMS IP GMBH & CO. KG, Schönefeld (DE)

(72) Inventors: Reiner Naumann, Mannheim (DE); Lars Wischgoll, Eberbach (DE)

(73) Assignee: Eaton Protection Systems IP GmbH & Co. KG, Schonefeld (DE)

( * ) Notice: Subject to any disclaimer, the term of this patent is extended or adjusted under 35 U.S.C. 154(b) by 0 days.

(21) Appl. No.: 15/571,927

(22) PCT Filed: May 6, 2016

(86) PCT No.: PCT/EP2016/060139
§ 371 (c)(1),
(2) Date: Nov. 6, 2017

(87) PCT Pub. No.: WO2016/177860
PCT Pub. Date: Nov. 10, 2016

(65) Prior Publication Data
US 2018/0138681 A1    May 17, 2018

(30) Foreign Application Priority Data
May 6, 2015   (DE) .................. 10 2015 208 400

(51) Int. Cl.
*H02G 3/22* (2006.01)
*H02G 3/32* (2006.01)
(Continued)

(52) U.S. Cl.
CPC .............. *H02G 3/22* (2013.01); *F16L 5/027* (2013.01); *H02G 3/0616* (2013.01); *H02G 3/088* (2013.01); *H02G 3/32* (2013.01)

(58) Field of Classification Search
CPC ............ H02G 3/22; H02G 3/32; H02G 3/088; H02G 3/0616; F16L 5/027
(Continued)

(56) References Cited

U.S. PATENT DOCUMENTS 4,319,951 A * 3/1982 Korbelak ............. G02B 6/4452
  156/158
4,608,454 A * 8/1986 Lackinger ............ H02G 3/0683
  174/651

(Continued)

FOREIGN PATENT DOCUMENTS

DE    4322032 C1 *  6/1994
DE    4322032 C1     6/1994
(Continued)

*Primary Examiner* — Timothy J Thompson
*Assistant Examiner* — Charles Pizzuto (57) ABSTRACT

A cable/line lead-in an insertion sleeve including a connection section and a contact, and a clamping part. The clamping part is detachably placeable on the connecting section of the insertion sleeve in the direction of the contact flange. The insertion sleeve and clamping part are assembled from at least two individual elements divided essentially in the axial direction. Guides are arranged along corresponding partition edges of the insertion sleeve and the clamping part are to accurately position the at least two individual elements of each insertion sleeve and clamping part. The guides interlock with one another. The cable/line lead-in is usable in regions at risk of explosion.

23 Claims, 5 Drawing Sheets

(51) Int. Cl.
*H02G 3/06* (2006.01)
*H02G 3/08* (2006.01)
*F16L 5/02* (2006.01)

(58) Field of Classification Search
USPC .......................................................... 174/520
See application file for complete search history.

(56) References Cited

U.S. PATENT DOCUMENTS

| | | | | |
|---|---|---|---|---|
| 4,849,723 | A | * | 7/1989 | Oliver, Jr. ............... G02B 6/264 |
| | | | | 333/208 |
| 6,425,776 | B1 | * | 7/2002 | Fredl ...................... H01R 13/59 |
| | | | | 439/320 |
| 6,761,189 | B2 | * | 7/2004 | Berninger ............ B25J 19/0025 |
| | | | | 138/104 |
| 2002/0092666 | A1 | * | 7/2002 | Hasegawa .............. H01R 12/61 |
| | | | | 174/92 |
| 2004/0177989 | A1 | * | 9/2004 | Nass .................. H01R 13/5205 |
| | | | | 174/655 |
| 2015/0069750 | A1 | | 3/2015 | Jung |

FOREIGN PATENT DOCUMENTS

| | | | |
|---|---|---|---|
| DE | 202009009807 U1 | 9/2009 | |
| EP | 1033801 A1 | 9/2000 | |
| JP | WO 2013 3161532 A1 * | 10/2013 | |
| WO | WO 9534929 A1 * | 12/1995 | ........... H02G 15/013 |
| WO | WO 9609483 A1 * | 3/1996 | ............... C09K 3/10 |
| WO | 2013161532 A1 | 10/2013 | |

\* cited by examiner

CABLE/LINE LEAD-IN

FIELD OF DISCLOSURE

The invention relates to a cable/line lead-in.

BACKGROUND

A cable/line lead-in is used for guiding cables or lines through a housing wall in a corresponding housing of an electrical device. The cable/line lead-in is generally formed from at least one insertion sleeve, which penetrates the housing wall and presses against the housing wall from one side by means of a contact flange, which protrudes radially outward at least at some points. To fix a cable or a line inside the insertion sleeve accordingly, the cable/line lead-in furthermore has at least one clamping part, which is detachably placeable on a connecting section of the insertion sleeve in the direction of the contact flange. Upon placement of this clamping part, clamping of the cable or the line takes place inside the insertion sleeve.

The insertion sleeve is additionally fixed on an end plug-in section, which is opposite to the connecting section, in relation to the housing wall, for example, in that a counter nut can be screwed onto this end plug-in section.

In certain cases, it is necessary to replace the cable/line lead-in, for example, because it is damaged. In order to prevent the cable lines from having to be disconnected from the corresponding electrical device in this case in order to arrange a new cable/line lead-in, it is proposed in DE 4322032 C1 that insertion sleeve and clamping part be assembled from at least two individual elements which are divided essentially in the axial direction and to arrange guide and/or positioning means along corresponding partition edges of these individual elements for the accurately-positioned assembly thereof. The option thus exists of replacing a cable/line lead-in with a new one without detaching corresponding cable or lines, by placing the corresponding individual elements on the cable or line and connecting them to one another.

SUMMARY

This solution described above does enable a replacement of the cable/line lead-in without shutting down the corresponding electrical device and without detaching the cable or the line, respectively, however, this solution is not usable for regions at risk of explosion. In such regions, corresponding protection classes have to be implemented, due to which the electrical operating means are suitable for hazardous environmental conditions. That is to say, the cable/line lead-in has to fulfill a certain protection class, which is classified, for example, according to the so-called IP code. In this case, IP stands for "ingress protection". Thus, for example, in industrial facilities, IP54 is typically installed, and in control cabinets, IP20 is installed. It can only be ensured that the electrical devices and facilities work even under more difficult environmental conditions if such a corresponding protection class is implemented. The more difficult environmental conditions relate, for example, to certain temperature ranges, corrosive stresses, resistance to aggressive media such as moisture, water, vapors, acids, or the like. The corresponding protection class is to be maintained stably even over a longer time in this case.

The following embodiments of the present invention is therefore based on the object of improving a cable/line lead-in of the type mentioned at the outset such that it implements a corresponding protection class and enables a secure and fixed connection of the corresponding individual elements, in particular with respect to the protection class.

According to one aspect of the invention, the cable/line lead-in is usable in regions at risk of explosion and the guide and/or positioning means are formed on opposing partition edges of the individual elements as interlocking guide and/or position means.

That is to say, according to one aspect of the invention, the cable/line lead-in fulfills corresponding requirements of the desired protection class, for example, IPx5 or IPx6 or also other IP protection classes and a connection of the individual elements already takes place by way of the corresponding guide and/or positioning means and not only by the placement of the clamping part or the counter nut. The cable/line lead-in can thus still be displaced along the cable or along the line even in the assembled state of insertion sleeve and clamping part and is then fixed at the corresponding installation position by clamping part and counter nut and sealed in relation to cable, line, and housing wall.

To enable an improved seal in relation to cable or line, respectively, the cable/line lead-in can furthermore have at least one in particular radially deformable sealing ring and/or pressure ring. Sealing ring and pressure ring can be arranged between clamping part and insertion sleeve. The sealing ring can have a section which is enlarged in diameter, and which presses against a corresponding step inside the insertion sleeve, for example, to thus determine the position of the sealing ring in the axial direction. This can also apply similarly to the pressure ring, wherein both rings can also be formed without such a diameter enlargement and can be positioned, for example, in corresponding depressions on an inner side of clamping part or insertion sleeve. The pressure ring can be able to be pushed onto the sealing ring. Depending on the diameter of the lines/cables, still further and/or thicker-walled pressure rings can be used.

To enable a seal in relation to cable or line except via the sealing ring and/or pressure ring, the connecting section of the insertion sleeve can have clamping lamellae, which are arranged in an iris shape in particular, on its free end facing toward the clamping part. They are bent radially inward in the direction of cable or line, respectively, when the clamping part is screwed on. In this case, the sealing ring and/or the pressure ring can be arranged between the clamping lamellae and the cable or the line, respectively.

To enable an improved seal in relation to the housing wall, the cable/line lead-in can have a flat seal ring placeable on an end plug-in section of the insertion sleeve. It is pressed against a corresponding opening edge of the housing wall to form a seal upon fixing of the insertion sleeve in relation to the housing wall, see the counter nut, for example.

One simple option for forming the clamping part can be seen if this clamping part is formed as a union nut having contact pressure collar in particular. If the union nut is screwed onto the connecting section of the insertion sleeve, a deformation of sealing ring and/or pressure ring and in particular the clamping lamellae is carried out in particular by the contact pressure collar. Due to this deformation, a seal of the cable/line lead-in in relation to the cable or the line, respectively, takes place and the remaining seal in relation to the housing wall takes place in particular due to the flat seal ring.

It is also generally ensured in conjunction with the corresponding sealing means that they are placeable on the cable or line without interruption of the electrical supply of the electrical/electronic device. For this purpose, sealing ring, pressure ring, and/or flat seal ring can each be able to be assembled from at least two open sealing ring halves. They are also placeable directly on the cable or line, respectively, and are fixable there by means of further placement of individual elements of the insertion sleeve and/or clamping part and can be pressed against cable/line or housing wall to form a seal.

It is also conceivable that not only two individual elements are used for insertion sleeve and clamping part and/or two sealing ring halves are used for the corresponding sealing rings. It is also possible that, for example, three, four, or also more parts are used, which increase the effort during the attachment and assembly of the corresponding parts, however.

There are also various options for arranging the division of the individual elements and/or the corresponding partition edges. One option is that the division and/or the partition edges of the individual parts and/or of the sealing ring halves extend essentially linearly in the axial direction of the cable/line lead-in. That is to say, the individual elements for insertion sleeve and clamping part consist, for example, of two half shells, which can be aligned in relation to one another via the corresponding guide and/or positioning means and are fastenable with one another by catch engagement. In particular in the case of the sealing ring halves, other connecting means can be provided, since the sealing rings are arranged in the interior of the cable/line lead-in, and do not have to have corresponding catch means, for example, which are to be correspondingly engaged with one another in particular with respect to the protection class to be implemented.

Furthermore, it is conceivable that the division and/or the partition edges of the parts extend in another manner, for example, in a spiral, stepped, wavy, or similar manner essentially in the axial direction.

One simple design of the guide and/or positioning means for locking can be seen if they are formed as catch hooks and/or catch pins, and/or catch tongues or the like having the corresponding counter elements in the form of snap-in and/or plug-in openings. There is also the option of forming the catch tongues, if catch hooks and/or catch pins are already used, only as plug-in tongues having corresponding plug-in openings.

It is furthermore conceivable that the corresponding guide and/or positioning means protrude from outer sides of the individual elements and/or insertion sleeve and clamping part and are engaged with one another after assembly of the individual elements. A simpler embodiment results, however, in that, for example, catch hooks and catch pins are arranged along one partition edge and corresponding catch opening is arranged along an opposing partition edge of the individual elements. The corresponding guide and/or positioning means are thus not externally visible after alignment and assembly of the individual elements.

This also applies similarly to plug-in tongues and plug-in openings, wherein plug-in tongues and corresponding plug-in openings can be arranged on opposing partition edges of the individual elements.

To enable snapping into the snap-in openings in a simple manner, in particular in the case of catch hooks and catch pins, the corresponding snap-in opening can be formed having an undercut.

It can be considered to be a further advantage if at least the snap-in opening associated with the catch hooks has an engagement opening, which is in particular open radially outward for detaching the catch engagement of the catch hook by engaging a detachment tool. That is to say, taking apart the individual elements is not possible without a corresponding detachment tool. This increases the security of the cable/line lead-in and such a detachment tool is only carried along and used by appropriate technicians, for example.

This also applies similarly to the snap-in opening of the catch pin, which can also be formed having an engagement opening accessible to a corresponding detachment tool.

It is also to be noted with respect to the guide and/or positioning means that they are producible, for example, by injection molding, extrusion, or the like. The production together with the further parts of the cable/line lead-in is thus simplified and is simultaneously possible with sufficient mechanical strength.

It was already indicated that a corresponding seal of the cable/line lead-in in relation to cable/line or housing wall is carried out by the sealing rings. To furthermore improve the seal, in particular along the partition edges of the individual elements of insertion sleeve and clamping part, or at least the insertion sleeve, a seal arranged essentially in the axial direction along the partition edges, in particular in the form of a tongue-and-groove connection, can be formed. This ensures a sufficient seal along the partition edges, wherein a stepped profile or a profile extending in another manner of the corresponding tongue-and-groove connection is also possible in the region of the partition edges.

For this purpose, it has furthermore generally proven to be advantageous if each individual element of at least the insertion sleeve has a groove along one partition edge and a tongue along the other partition edge of the other individual element. These interlock upon assembly of the individual elements and complete the seal of the cable/line lead-in, in particular also with respect to the desired protection class.

In the case of such seals, the cable/line lead-in according to one embodiment of the invention can also meet requirements of increased safety of the explosion protection, see, for example, Ex-e or Ex-i.

To improve the seal in this context, a sealing element can be arranged in the groove in particular.

In general, it can be considered to be sufficient if one catch hook, one catch pin, one catch tongue, or one plug-in tongue is arranged in each case along a corresponding partition edge. However, these can also be arranged in a greater number, for example, in pairs or also in groups of three or four along a partition edge. In particular in conjunction with the plug-in tongues, it can furthermore prove to be advantageous if at least the plug-in tongues and corresponding plug-in openings are arranged in pairs along a partition edge, to simplify corresponding centering of the individual elements for positioning. In this case, however, the option also exists that the corresponding plug-in tongues or plug-in openings have different widths, to improve an assignment of the various elements to one another, for example. It is also conceivable at least in conjunction with the plug-in tongues and plug-in openings that they are formed having different widths, so that a certain play in the axial direction during the assembly of the individual elements is possible solely by way of plug-in openings and plug-in tongues, which results in accurate relative positioning of the corresponding individual elements upon engagement of the further catch elements, however.

It is furthermore conceivable that, for example, the various components of the guide and/or positioning means protrude at different lengths from the corresponding partition edges and also the corresponding openings have different and matching depths. The option thus exists, for example, of firstly achieving an assignment of the individual elements via an engagement of the plug-in tongues in corresponding plug-in openings, even before the further catch elements are engaged with corresponding catch openings. That is to say, for example, a first positioning and centering of the individual elements takes place via plug-in tongues and plug-in openings, which then results in more accurate centering and positioning upon further engagement of the catch elements with catch openings.

As already stated, the seals are also formed by corresponding sealing ring halves. The option thus exists, on the one hand, that these sealing ring halves are inserted into corresponding receptacles of the remaining parts of the cable/line lead-in. However, it can be considered to be advantageous if the sealing ring halves are also detachably connected to one another.

Different options are conceivable for such a connection. One example can be seen in that the sealing ring halves each have at least one insertion groove and one insertion projection on partition edges facing toward one another. During the assembly of the sealing ring halves, they are initially arranged somewhat offset in relation to one another in the axial direction, so that the insertion projection of one partition edge can be inserted into the insertion groove on the other partition edge in the axial direction. After complete insertion of the insertion projection into the insertion groove, the sealing ring halves are then both connected to one another and also aligned correctly in relation to one another.

One option for the formation of insertion groove and insertion projection can be that they are formed as a dovetail connection.

A further option, in particular for the connection of the sealing ring halves of the flat seal, can be that they each have a press-in depression and/or a press-in projection on ends facing toward one another. That is to say, the two sealing ring halves of the flat sealing ring are connected to one another and aligned in relation to one another by pressing the press-in projection into the press-in depression.

As already stated, such a sealing arrangement is optionally also advantageous in another form, which is formed at least along the partition edges of the individual elements of the insertion sleeve so that a sufficient seal can be provided along these partition edges with respect to protection class and possibly explosion protection.

BRIEF DESCRIPTION OF THE DRAWINGS

Advantageous exemplary embodiments of the invention will be explained in greater detail here on the basis of the figures of the drawing.

In the figures:

FIG. 1 shows a perspective illustration of an assembled cable/line lead-in;

FIG. 2 shows an exploded illustration of the cable/line lead-in according to FIG. 1;

DETAILED DESCRIPTION

Figures 1, 2:
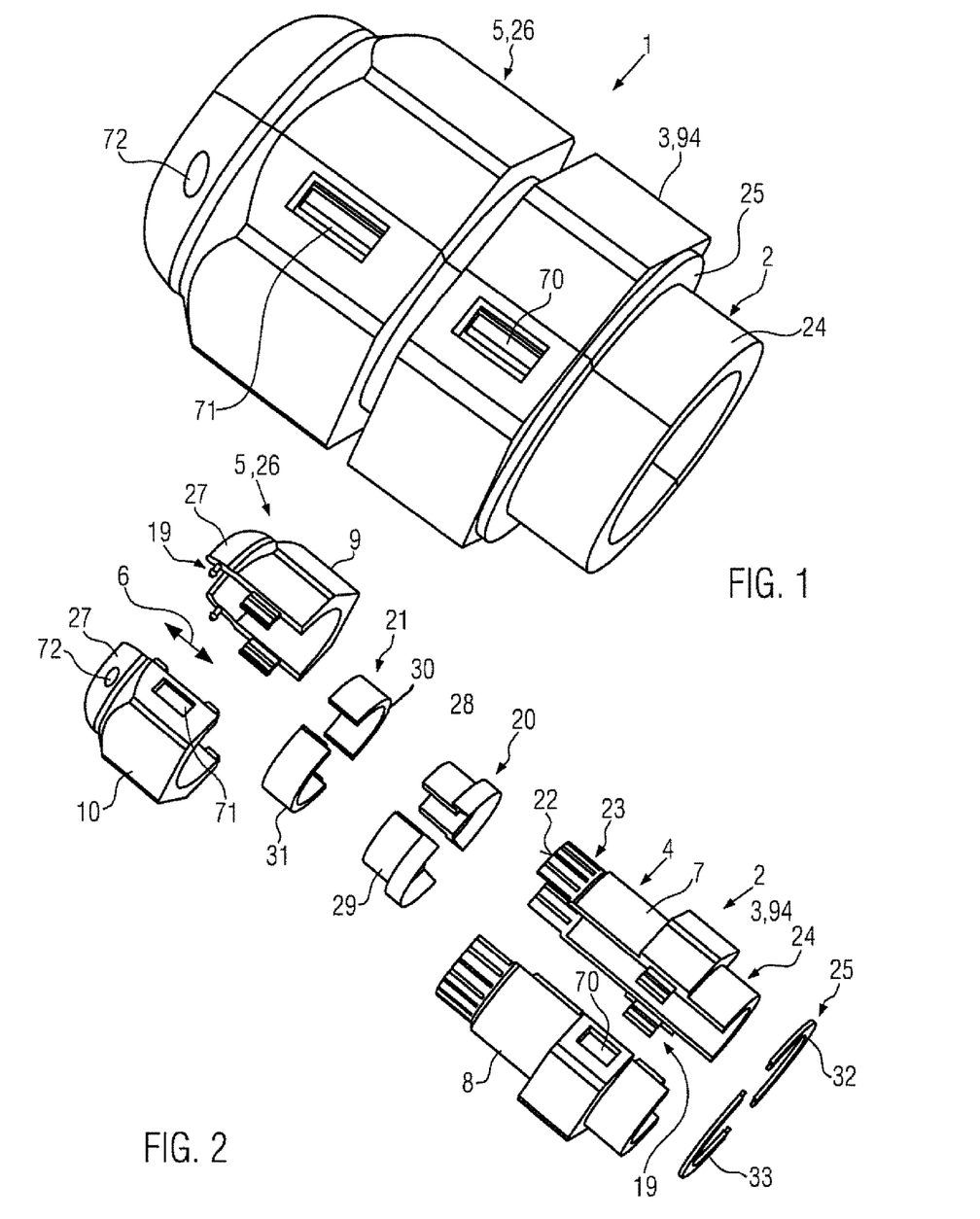

FIG. 1 relates to a perspective view of an assembled cable/line lead-in 1 according to one embodiment of the invention. It comprises an insertion sleeve and/or an intermediate connecting piece 2, each referred to hereafter as insertion sleeve, and a clamping part 5 in the form of a union nut 26. The union nut 26 is screwed onto a connecting section 4 of the insertion sleeve 2, see also FIG. 2. The insertion sleeve 2 furthermore has a polygonal collar 94 for the engagement of a wrench, which simultaneously forms a contact flange 3 with its radially protruding end faces. A flat seal ring 25 pushed onto an end plug-in section 24 presses against one of these contact flanges 3. When the cable/line lead-in 1 is installed, this flat seal ring presses against an edge of an opening in a housing wall. The cable/line lead-in 1 is used in this case for feeding a cable or a line through the corresponding wall opening into the interior of the housing. Furthermore, a counter nut is screwed onto the end plug-in section 24 in this context. A corresponding thread on an outer side of the end plug-in section 24 is not shown in FIG. 1 for simplification.

Both clamping part 5 and also insertion sleeve 2 have engagement openings 70 or 71, respectively, which are open radially outward. These are used for a tool engagement for a detachment tool, by means of which a catch engagement of corresponding guide and/or positioning means 19 is detachable, see the following figures. A further engagement opening 72 is arranged in the front region of the clamping part 5 and is used similarly for detaching a corresponding catch engagement, see the following figures.

FIG. 2 shows an exploded illustration of the cable/line lead-in 1 according to FIG. 1. In this figure, it is recognizable in particular that all parts of the cable/line lead-in 1 are constructed in two parts from corresponding individual elements 7, 8; 9, 10 and sealing ring halves 28 to 33.

The clamping part 5 as the union nut 26 has two individual elements 9 and 10. These are connectable to one another along corresponding partition edges 15, 16 and 17, 18, see also FIGS. 5 and 6. This applies similarly to the individual elements 7 and 8 of the insertion sleeve 2 having partition edges 11, 12, 13, and 14, see also FIGS. 3 and 4.

Guide and/or positioning means 19 in the form of catch hooks 44, 45, catch pins or journals 46, 47, and plug-in tongues 48 to 55 are arranged along these partition edges of clamping part and insertion sleeve. These can be plugged into corresponding snap-in openings 56 to 61 or plug-in openings 62 to 69.

Figure 3:
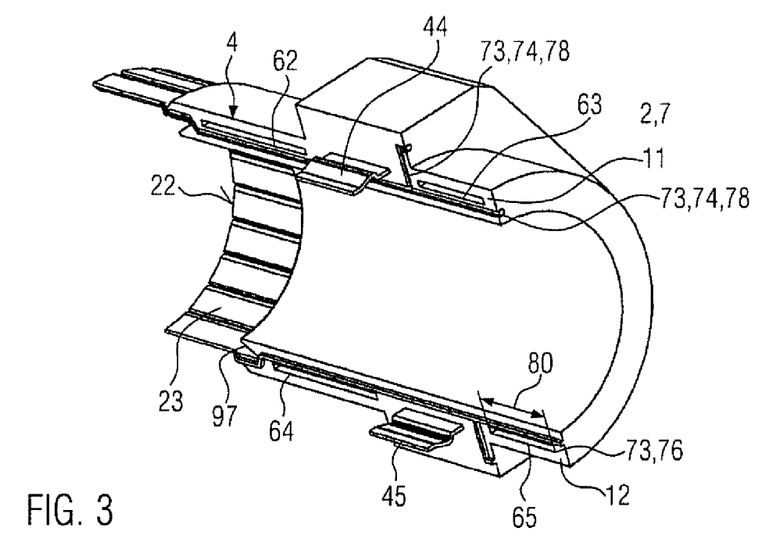
FIG. 3 shows a perspective view of a first individual element of an insertion sleeve.
Figure 4:
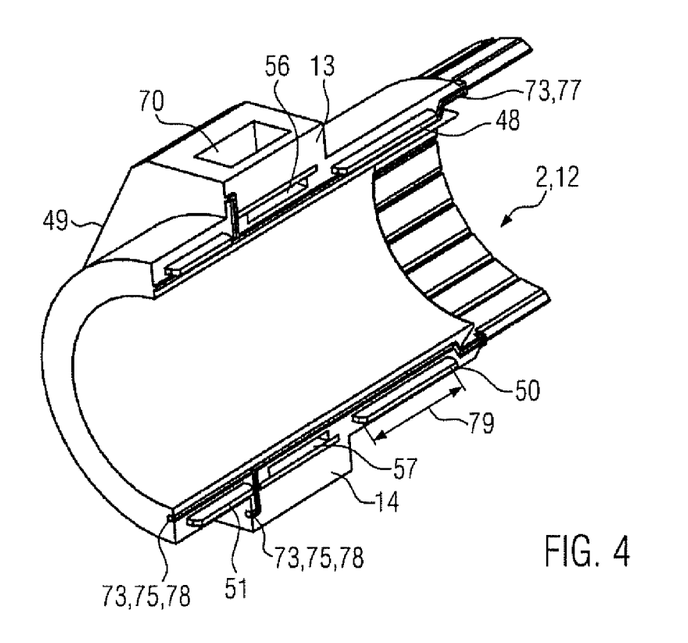
FIG. 4 shows a perspective view of a second individual element of the insertion sleeve.

The individual elements 7, 8 of the insertion sleeve 2 have at least one catch hook 44, 45 along both partition edges 11, 12 in the individual element 7, see also FIGS. 3 and 4. These catch hooks protrude from the partition edges 11, 12 and point in the direction of corresponding snap-in openings 56, 57, which are formed on the corresponding partition edges 13, 14 of the individual element 8. Furthermore, the engagement openings 70 are provided in the region of the snap-in openings 56, 57, by means of which the catch engagement of catch hook 44 or 45 with corresponding snap-in opening 56 or 57, respectively, can be disengaged. The corresponding engagement tool is required for the engagement in the engagement openings 70.

Further parts of the guide and/or positioning means 19 are arranged along the partition edges 11 and 12 of the individual element 7 or the partition edges 13 and 14 of the individual element 8, respectively. These parts include, for example, the catch tongues or plugin tongues 48 to 51. These are arranged along the upper partition edge 13 or along the lower partition edge 14, respectively. The catch tongues 49 and 51 have the same width 80, see also FIG. 3, wherein the catch tongues 48 and 50 have a greater width 79. The plug-in openings 62, 63, 64, and 65 are arranged in the partition edges 11 and 12 of the individual element 7, see FIG. 3, and have corresponding widths 79 or 80.

The catch hooks 44, 45 are arranged in the region of the polygonal collar 94.

It can furthermore be seen in FIGS. 2 to 4 that a plurality clamping lamellae 23 is arranged in an iris shape at the corresponding end 22 of the connecting section 4. These are displaced radially inward by a contact pressure collar 27 in particular during the screwing on of the clamping part 5. They thus both press against sealing ring 20 or pressure ring 21 and also via this against the cable or line.

In general, a thread, which is not shown in the figures for simplification, for screwing on the union nut 26 as the clamping part 5 is provided between clamping lamellae 23 and contact flange 3.

The union nut 26 is constructed from the corresponding individual elements 9 and 10, which have guide and/or positioning means 19 similarly to the individual elements 7 and 8 of the insertion sleeve 2 (also called intermediate connecting piece). These guide and/or positioning means are shown in FIGS. 5 and 6.

Figure 5:
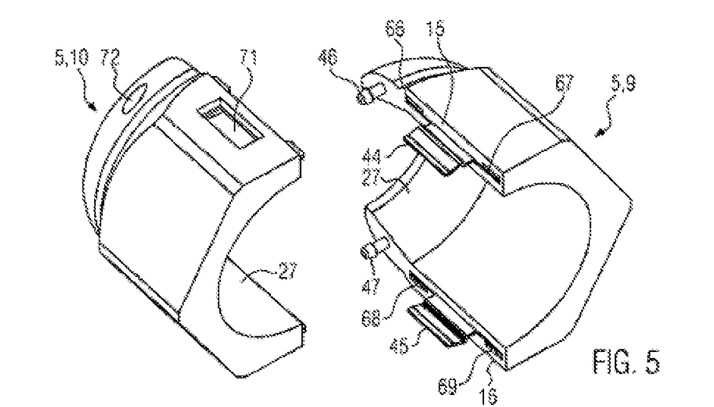
FIG. 5 shows a perspective view diagonally from the rear of individual elements of a clamping part.
Figure 6:
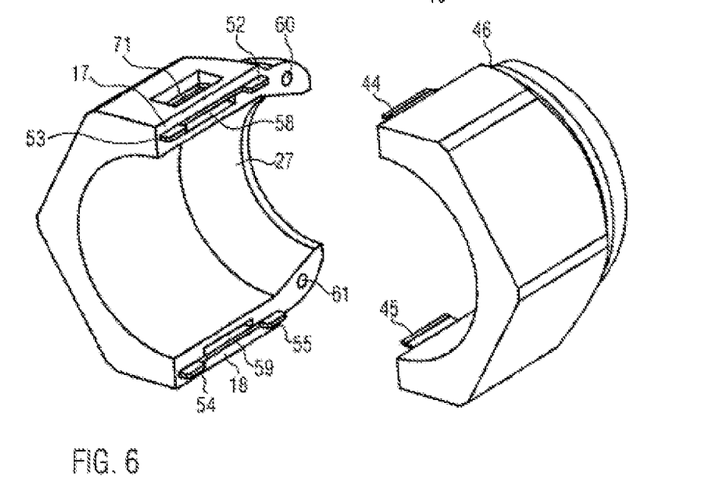
FIG. 6 shows a further perspective view of the individual elements of the clamping part according to FIG. 5.

The corresponding guide and/or positioning means 19 also comprise catch hooks 44 and 45, see, for example, FIG. 2 or 5 and also snap-in openings 58, 59 arranged in the respective other individual element. Each snap-in opening is also accessible here by means of a corresponding engagement tool via an engagement opening 71 which is open radially outward, to detach the catch engagement of catch hooks and snap-in openings. The corresponding snap-in openings generally have an undercut, with which the catch hooks or catch pins lock. Corresponding catch pins 46, 47 protrude from the partition edges 15, 16 of the individual element 5, see in particular FIG. 5. Snap-in openings 60, 61 corresponding to the catch hooks 46, 47 are arranged in the partition edges 17, 18 of the individual element 10. An engagement opening 72 is also associated with these snap-in openings, see in particular FIGS. 2 and 5. Furthermore, the partition edges 17, 18 have catch or plug-in tongues 53, 54, 52, and 55, which are arranged in pairs laterally adjacent to the snap-in openings 58, 59. In this case, the tongues 52 to 55 are of equal width, as are the associated plug-in openings 66, 67, 68, and 69 in the partition edges 15 and 16 of the individual element 9.

The catch hooks are used for the automatic locking and connecting to one another of the corresponding individual elements, as are the catch pins or journals. In addition, at least the catch pins/journals are also additionally used for centering, as are the corresponding plug-in openings and plug-in tongues on the respective partition edges.

The option exists of varying the number of the corresponding catch hooks, catch pins/journals, or plug-in tongues, so that fewer or more of these elements are also usable as the guide and/or positioning means. It is also conceivable that, for example, the catch hooks in the individual elements 7, 8 of the insertion sleeve 2 are supplemented by corresponding catch pins/journals, see the individual elements 9 and 10 of the clamping part 5 for comparison. Furthermore, the option also exists that the corresponding plug-in tongues, see FIGS. 5 and 6, have different widths and/or length, see FIGS. 3 and 4 in comparison for this purpose.

A sealing structure is arranged at least in the region of the partition edges 11, 12 and 13, 14 of the two individual elements 7 and 8 of the insertion sleeve 2. This supplements the seal by the sealing rings 20, 21, and 25 by means of the cable/line lead-in. The sealing structure is formed in the illustrated exemplary embodiment by a tongue-and-groove connection 73 made of grooves 74, 75 and tongues 76, 77. In addition, a thread-shaped seal element 78 is inserted into the respective groove 74 or 75. This is visible in particular in FIGS. 3 and 4. The grooves and/or tongues extend essentially in the axial direction 6 of the cable/line lead-in 1. However, some deviations occur in the axial profile, see, for example, in the region of the polygon collar 94 and/or at ends of grooves and tongues which are associated with the clamping lamellae 23.

In the illustrated exemplary embodiment, the corresponding groove 74 or 75 is arranged in the partition edges 11 or 14, respectively, and the sealing element 78 is arranged in these grooves. The tongue 76 or 77 is formed in the further partition edges 12 or 13, respectively. The corresponding guide and/or positioning means 19 are arranged farther radially outward in relation to tongue-and-groove having sealing element.

Corresponding grooves and tongues can also be arranged in the individual elements 9, 10 of the clamping part 5. However, such an arrangement is generally not necessary, since a corresponding seal in relation to the cable or to the line is carried out by the seal rings 21 or 20 between clamping part 5 and insertion sleeve 2.

Figure 7:
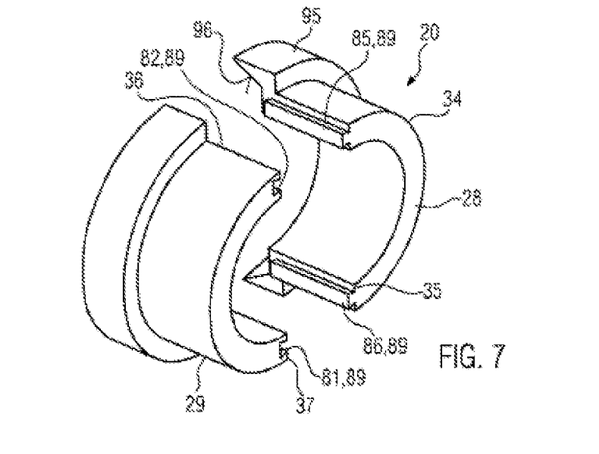
FIG. 7 shows a perspective view diagonally from the rear of sealing ring halves of a sealing ring.

The sealing ring 20 is illustrated enlarged and in perspective in FIG. 7. In particular, it is recognizable that it has a diameter enlargement 95 on one side, which has an intake bevel 96 on its inner side. This has a bevel extending radially outward in the direction of clamping lamellae 23, see also FIG. 2. The intake bevel 96 engages in a corresponding intake groove 97 at the end of the clamping lamellae 23.

To connect corresponding sealing ring halves 28, 29 of the sealing ring 20, connecting means are arranged along partition edges 34, 35 and 36, 37, respectively. These are formed in the illustrated exemplary embodiment as insertion grooves 81 or 82 in the sealing ring half 29 or as insertion projections 85 or 86 in the sealing ring half 28, respectively. The corresponding insertion grooves are open in the axial direction at least at one end, so that the insertion projections are insertable into the insertion grooves from this end, wherein a connection 89 similar to a dovetail results overall. The corresponding grooves and projections are formed along partition edges 34, 35 or 36, 37 of the sealing ring halves 28 and 29.

Figure 8:
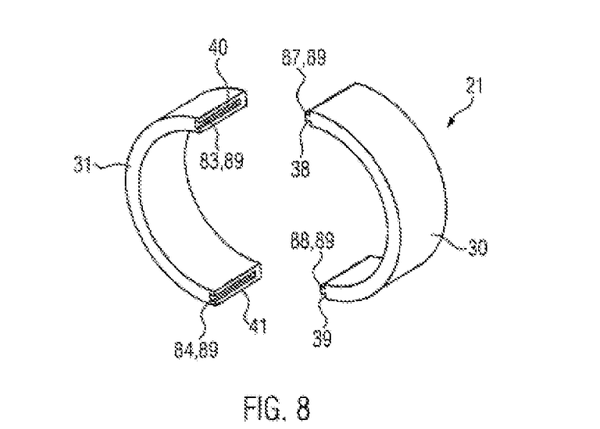
FIG. 8 shows a perspective view of sealing ring halves of a sealing ring.

The connection of sealing ring halves 30, 31 of the pressure ring 21 is carried out similarly, see FIGS. 2 and 8. These sealing ring halves also have corresponding partition edges 38, 39 or 40, 41, respectively. Insertion grooves 83, 84 or insertion projections 87 and 88 are arranged in these partition edges. These are also insertable from an open end of the insertion groove 83 or 84 and form a connection 89 similar to a dovetail.

Figure 9:
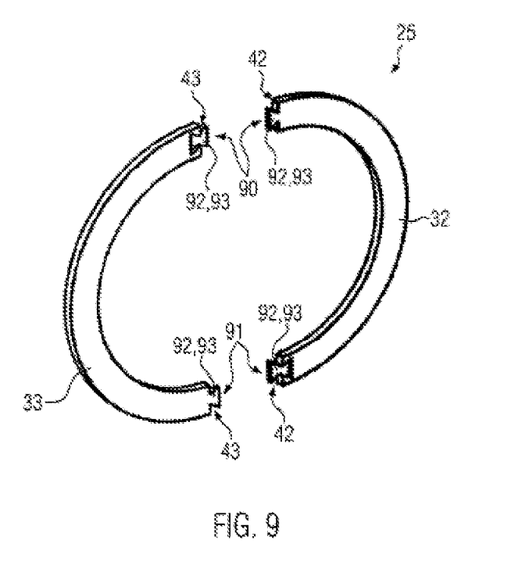
FIG. 9 shows a perspective view of sealing ring halves of a flat seal ring.

FIG. 9 shows a corresponding enlarged view of the flat seal ring 25, which is formed from sealing ring halves 32 and 33. These also have corresponding connecting means on partition edges 42 or 43, respectively. In this case, the connecting means are arranged at ends 90 or 91 of the sealing ring halves 32, 33, specifically in the form of a press-in depression 92 or a press-in projection 93, respectively. It is to be noted in this case that essentially the press-in projection 93 protrudes from the respective end 90 or 91, while corresponding press-in depressions 92 are also formed on the other side of the sealing ring halves. This is recognizable in particular in the press-in projections or press-in depressions 92, so that a combination of press-in projection and press-in depression is arranged on each end 90 or 91.

According to one embodiment of the invention, the option thus results of providing a cable/line lead-in for use in regions at risk of explosion, which implements a corresponding protection class and also explosion protection conditions such as Ex-i and Ex-e. This also applies in particular due to the sealing options in the cable/line lead-in according to one embodiment of the invention and also the detachment of the corresponding individual elements only by use of a corresponding tool.

The invention claimed is:

1. A cable/line lead-in comprising:
   an insertion sleeve including a connecting section and a contact flange protruding radially outward from adjacent the connecting section, and
   a clamping part which is detachably placeable on the connecting section of the insertion sleeve in the direction of the contact flange,
   wherein the insertion sleeve, and the clamping part are assembled from at least two individual elements divided essentially in the axial direction, wherein the at least two individual elements of each insertion sleeve and clamping part include guides arranged along corresponding partition edges of the at least two individual elements to accurately position the at least two individual elements of each insertion sleeve and clamping part with respect to one another when the at least two individual elements are assembled, wherein the at least two individual elements of the insertion sleeve include a sealing tongue-and-groove connection extending in the axial direction along the corresponding partition edges of the at least two individual elements to form a seal between the at least two individual elements when the at least two individual elements are assembled,
   wherein the cable/line lead-in is usable in regions at risk of explosion,
   wherein the guides are interlocked with one another.

2. The cable/line lead-in as claimed in claim 1, wherein the cable/line lead-in further includes at least one of: a sealing ring which is radially deformable; and a pressure ring which is radially deformable.

3. The cable/line lead-in as claimed in claim 1, wherein the connecting section has clamping lamellae on its free end facing toward the clamping part.

4. The cable/line lead-in as claimed in claim 2, wherein the cable/line lead-in has a flat seal ring placeable on an end insertion section of the insertion sleeve.

5. The cable/line lead-in as claimed in claim 1, wherein the clamping part comprises a union nut having a contact pressure collar.

6. The cable/line lead-in as claimed in claim 4, wherein at least one of the sealing ring, the pressure ring, and the flat seal ring can each be assembled from at least two open ring halves.

7. The cable/line lead-in as claimed in claim 6, wherein the division edges of the individual elements and/or the sealing ring halves extends/extend linearly in the axial direction of the cable/line lead-in.

8. The cable/line lead-in as claimed in claim 6, wherein the division edges of the individual elements and/or the sealing ring halves extend in a spiral, stepped, wavy, or similar manner essentially in the axial direction.

9. The cable/line lead-in as claimed in claim 1, wherein the guides comprise catch hooks and/or catch pins and/or catch and/or plug-in tongues with corresponding counter elements in the form of snap-in and/or plug-in openings.

10. The cable/line lead-in as claimed in claim 9, wherein the guides comprise catch hooks and catch pins arranged along one partition edge and wherein corresponding snap-in openings are arranged along an opposing partition edge of the individual elements.

11. The cable/line lead-in as claimed in claim 9, wherein the guides comprise plug-in tongues and wherein corresponding plug-in openings are arranged on opposing partition edges of the individual elements.

12. The cable/line lead-in as claimed in claim 10, wherein the snap-in openings are formed with an undercut.

13. The cable/line lead-in as claimed in claim 10, wherein the snap-in openings associated with the catch hooks have engagement openings, which are open radially outward, for engagement of a detachment tool for detaching the catch engagement of the catch hooks.

14. The cable/line lead-in as claimed in claim 1, wherein the at least two individual elements of the clamping part include a sealing tongue-and-grove connection extending in the axial direction along the corresponding partition edges of the at least two individual elements to form a seal between the at least two individual elements when the at least two individual elements are assembled.

15. The cable/line lead-in as claimed in claim 1, characterized in that each individual element of at least the insertion sleeve has a groove along one partition edge and a tongue along the other partition edge.

16. The cable/line lead-in as claimed in claim 15, further comprising a seal element arranged in the groove.

17. The cable/line lead-in as claimed in claim 11, wherein the plug-in tongues and plug-in openings are arranged in pairs along a partition edge.

18. The cable/line lead-in as claimed in claim 17, wherein the plug-in tongues of the individual elements have different widths in the axial direction.

19. The cable/line lead-in as claimed in claim 6, wherein the ring halves are detachably connectable to one another.

20. The cable/line lead-in as claimed in claim 19, wherein the ring halves each have at least one insertion groove and a corresponding insertion projection on partition edges facing toward one another.

21. The cable/line lead-in as claimed in claim 20, wherein the insertion groove and insertion projection are formed as a dovetail connection.

22. The cable/line lead-in as claimed in claim 20, wherein the sealing ring halves of the flat seal ring each have a press-in depression and/or a press-in projection on ends facing toward one an-other.

23. The cable/line lead-in as claimed in claim 1, further comprising a sealing arrangement formed at least along the partition edges of the individual elements of the insertion sleeve.

* * * * *